A. KINGSBURY.
BEARING FOR HORIZONTAL OR INCLINED SHAFTS.
APPLICATION FILED NOV. 27, 1918.
1,425,978.
Patented Aug. 15, 1922.
3 SHEETS—SHEET 3.
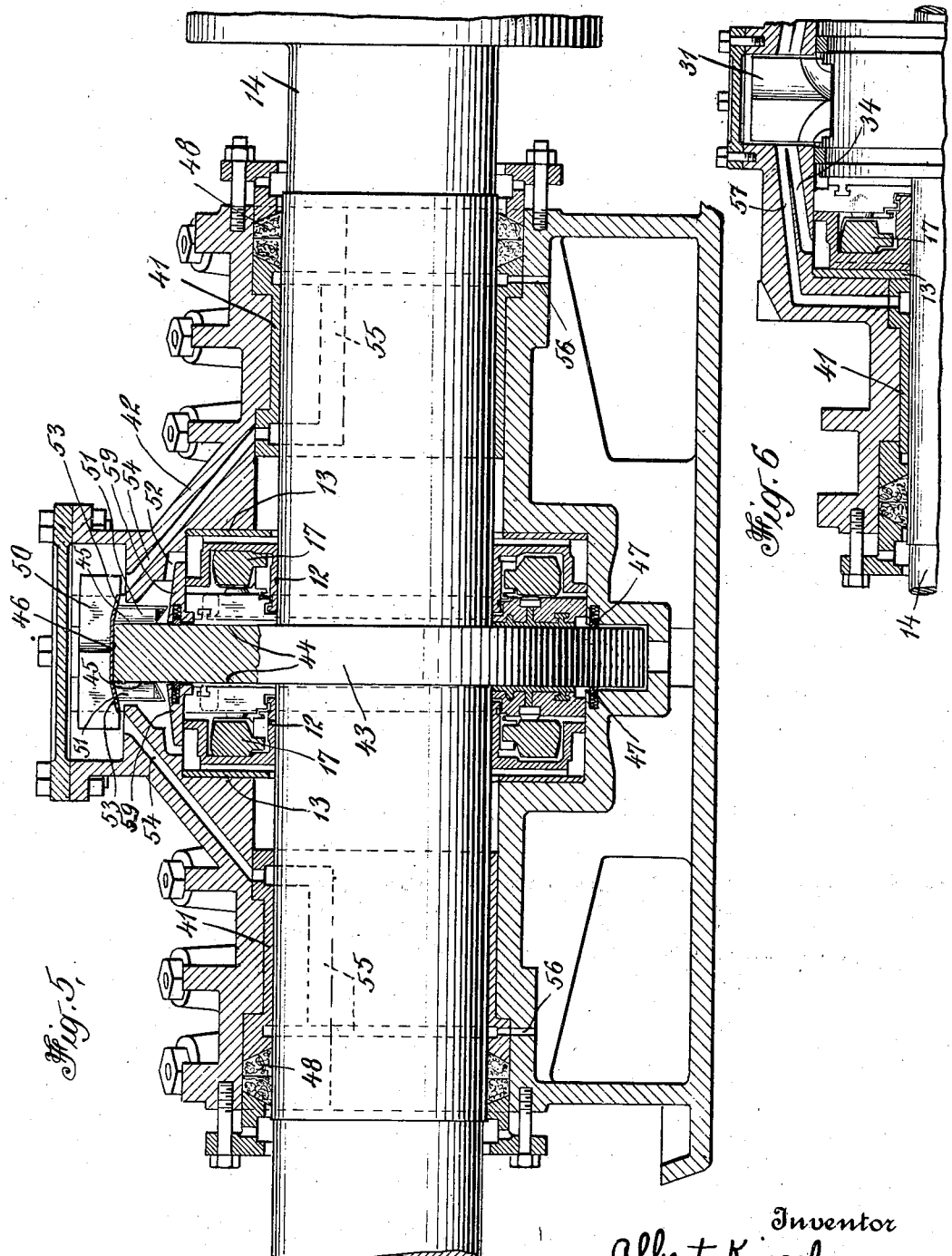

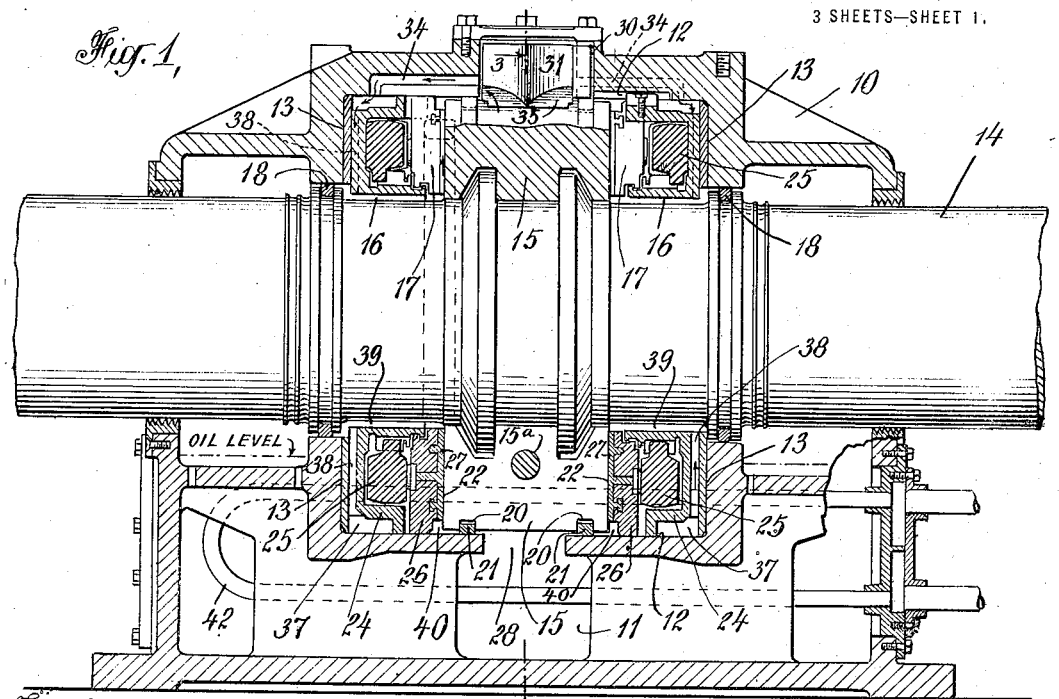

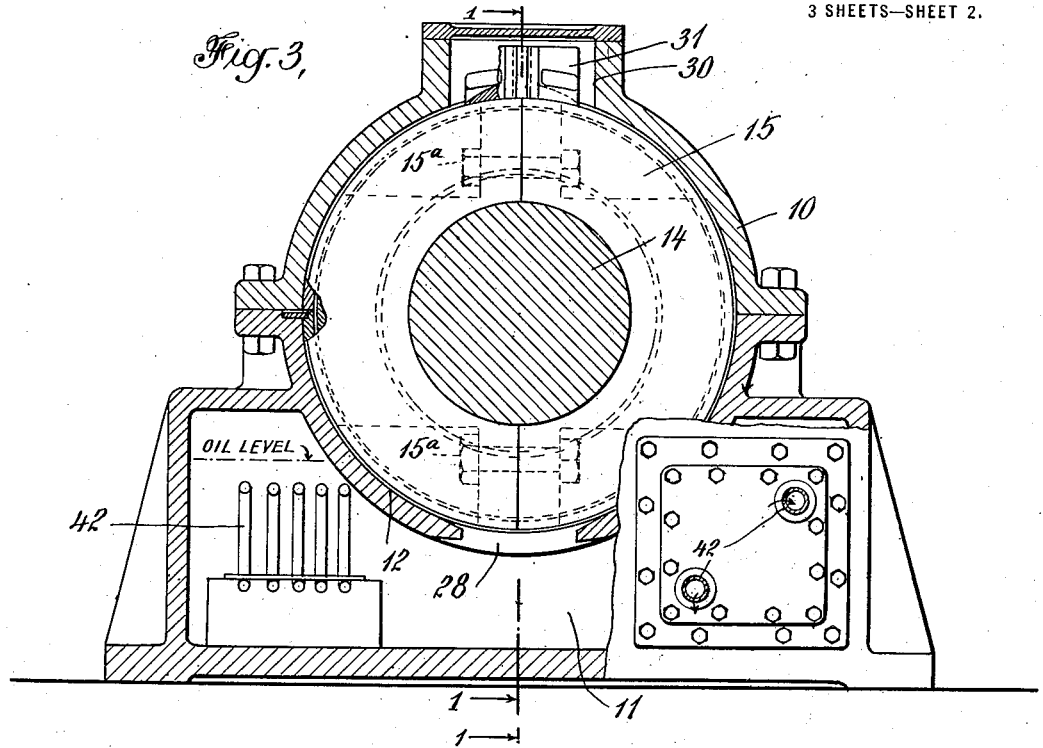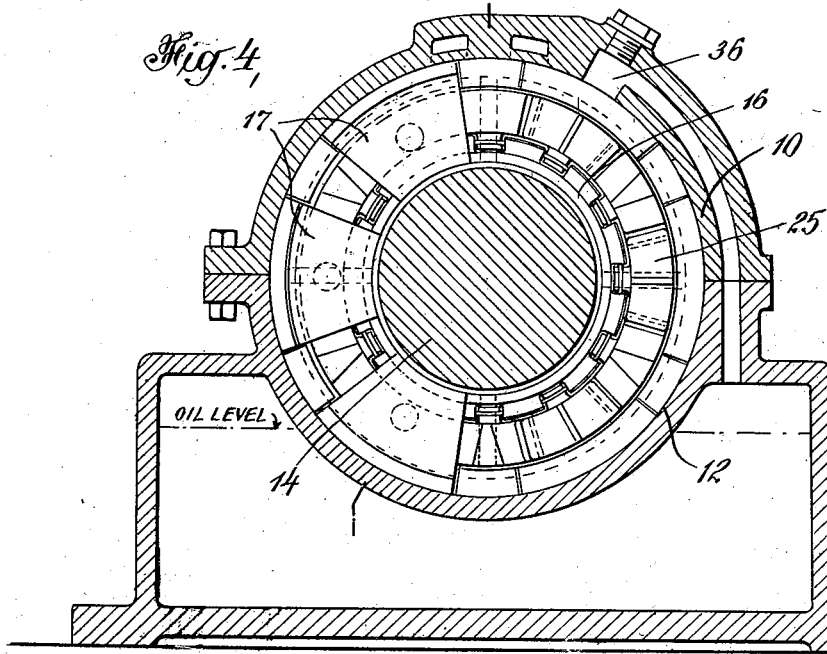

UNITED STATES PATENT OFFICE.

ALBERT KINGSBURY, OF PITTSBURGH, PENNSYLVANIA.

BEARING FOR HORIZONTAL OR INCLINED SHAFTS.

1,425,978.  Specification of Letters Patent.  Patented Aug. 15, 1922.

Application filed November 27, 1918. Serial No. 264,287.

*To all whom it may concern:*

Be it known that I, ALBERT KINGSBURY, a citizen of the United States of America, and a resident of Pittsburgh, Allegheny County, and State of Pennsylvania, have invented certain new and useful Improvements in Bearings for Horizontal or Inclined Shafts, of which the following is a specification, reference being had to the accompanying drawings, forming a part thereof.

My invention relates to bearings, particularly thrust bearings, and it has special reference to thrust bearings of the type which are adapted for use with the propeller shafts of ships and other substantially horizontal or inclined shafts. More particularly, it relates to bearings of the type which employs tiltable bearing segments or shoes and is of the same general character as that shown and described in my copending application Serial No. 222,336 filed March 14, 1918.

Tiltable shoe thrust bearings of the vertical type are readily arranged in such manner that all portions of the bearing surfaces are completely immersed in a bath or pool of oil, the spaces between the shoes and all the spaces at or adjacent to the bearing surfaces being completely filled with lubricant.

As described in my copending application above referred to, lubricant may be supplied to the bearing members of horizontal bearings by causing a stream of oil to flow around and between the bearing members under the action of the rotating parts, but according to my present invention I provide such an arrangement of parts in a bearing of this type that the spaces or chambers in which the bearing members are disposed are automatically maintained full of oil, when the bearing is in operation, by the movement of the bearing members themselves. In other words, it has been my aim to provide a bath or pool of oil for bearings of the horizontal or inclined type in which the bearing members are completely immersed—under running conditions—and which is, therefore, as effective in continuously and automatically lubricating the bearing surfaces as the pool of oil surrounding the corresponding parts of a vertical thrust bearing.

Another object of my invention is to provide a thrust bearing for a horizontal or inclined shaft with one or more sealed annular chambers in which cooperating thrust bearing members are disposed, in combination with means for automatically supplying oil to the said sealed chamber or chambers and for maintaining the same full of oil when the bearing is in operation.

In order that my invention may be thoroughly understood I will now proceed to describe the same in the following specification, and will then point out the novel features thereof in appended claims. The invention, however, is capable of receiving a variety of mechanical expressions some of which are shown on the accampanying drawings, but it is to be expressly understood that the drawings are for purposes of illustration only and are not to be construed as a definition of the limits of the invention, reference being had to the appended claims for that purpose.

Refering to the drawings:

Figure 1 is a longitudinal sectional elevation, taken on the line 1—1 of Figures 2, 3 and 4, of a thrust bearing arranged and constructed in accordance with my invention and constituting one embodiment thereof.

Figure 2 is a partially sectional plan view of the same bearing, the casing being partially broken away to show the interior construction more in detail.

Figure 3 is a transverse sectional elevation taken on the line 3—3 of Figure 1, a corner of the housing being shown in end elevation to disclose the cooling coil inlet and outlet terminals.

Figure 4 is a similar view taken through one of the lubricating chambers in which the bearing members are disposed.

Figure 5 is an elevation corresponding to Figure 1 but showing another embodiment of my invention which includes guide as well as thrust bearing members.

Figure 6 is a partial elevation of another guide and thrust bearing structure which embodies my invention and constitutes a slight modification of the Figure 4 construction.

In the form shown in Figures 1 to 4 inclusive, 10 designates the bearing housing which has an oil reservoir 11 at the bottom, the level of the oil being indicated by the dot and dash line marked "oil level". The housing is enlarged to form a central annular chamber 12 having a pair of opposite supporting surfaces 13—13 on each of which is mounted a bearing member of any suitable construction, such as a tiltable segment or shoe thrust bearing system 17—17. The shaft 14 extends through the housing with its axis coincident with the axis of the central housing chamber 12. A thrust collar 15—which is shown as composed of sectors secured together by bolts 15ª or some other suitable means—is mounted on the shaft midway between the opposed surfaces 13—13 so as to divide the chamber 12 into a pair of lubricating chambers 16—16. Means of any suitable character are provided in association with the aforesaid parts to render said chambers 16—16 capable of retaining oil, so that the bearing members may be immersed in oil when the bearing is in operation. In the form shown, the thrust collar 15 is provided with annular grooves 20—20, in which wiper rings 21—21 are disposed so as to constitute sealing rings at the inner adjacent ends of the annular chambers 16—16,—the shaft being provided with another pair of wiper rings 18—18 which correspondingly seal the outer ends of the said chambers. These chambers 16—16 are thus rendered sufficiently tight to permit them to be completely filled with oil and maintained in that condition during the operation of the bearing.

The thrust collar 15 is provided with thrust surfaces 22—22 which cooperate with the relatively stationary tiltable shoe systems 17—17, which are located in the chambers 16—16 and are mounted on the supporting faces 13—13 as hereinbefore set forth.

In the form shown, each of the relatively stationary shoe systems comprises a plurality of tiltable bearing shoes or segments, and means for equalizing the thrust pressure among them. The detail structure of these shoes or segments and the equalizing means therefor forms no part of my present invention and any suitable arrangement may be employed. I have illustrated a structure in which these tiltable shoe bearing systems are substantially identical, each of them being similar in structure to the shoe system shown and described in my copending application Serial No. 209,617, filed Dec. 31, 1917, and comprising a base ring 24 of channel-shaped cross-section that carries a plurality of equalizer blocks 25 which constitute a substantially continuous flexible supporting ring for the bearing shoes or segments 26.

The shoes or segments are provided with bearing faces 27 which cooperate with the surfaces 22 of the thrust collar. They are free to tilt both radially and circumferentially on the flexible ring equalizers which act in turn to secure the proper distribution of pressure among the same.

In the central chamber 12 there is an opening 28 at the bottom constituting an oil passage from the oil reservoir 11 to the annular space around the thrust collar 15 between the sealing rings 21—21.

It is evident from Figures 1 and 3 that the oil level in the reservoir 11 is below the bottom of the shaft 14 and that in consequence of this the possibility of leakage from the reservoir around the shaft is practically eliminated. The level is however sufficiently high to immerse the lower part of the circumferential surface of the thrust collar and consequently, when the bearing is in operation, this surface constitutes an oil carrying surface and transfers oil to the top of the bearing.

At the top of the bearing the housing is enlarged to form a pocket 30 in which a relatively stationary oil scraper 31 of any suitable construction is disposed. The walls of the housing pocket are shown as provided with openings 32—32 into which lateral lugs 33—33 of the scraper extend. The arrangement of parts is such that these lugs hold the scraper loosely in position, and as they are axially disposed relative to the shaft 14, they also permit the scraper to tilt circumferentially and to seat itself on the outer cylindrical surface of the thrust collar 15. The bottom surface of the scraper is preferably curved to conform to the cylindrical outer surface of the collar with which it cooperates. In the form shown, the scraper has at each end an oil collecting edge 35 which extends across the annular surface of the thrust collar, and removes a large proportion of the oil from the oil carrying surface. It is also tapered at each end to provide a sharp vertical edge which divides the collected or dammed up stream of oil and causes it to flow axially into oil receiving passages 34—34. The passages 34—34 extend axially of the housing and open into the top of the chambers 16—16. When the bearing is in operation the chambers 16—16 are immediately filled with oil which is carried up on the revolving surface of the collar 15, removed therefrom by the scraper 31 and discharged through the passages 34—34 into the said chambers.

In order to provide for a continuous circulation of lubricant through the chambers, overflow or outlet passages 36—36 are provided in the housing, which carry the excess of oil back again into the reservoir 11.

The oil, as it is discharged through the passages 34—34, enters the annular passages 37—37, around the base rings 24—24, from which the oil flows through radial passages 38—38 at the back of the base rings,— as indicated by the arrows,—to the spaces 39—39 around the shaft 14. From these spaces it flows outward between the bearing shoes 26 to the narrow annular passages 40—40 at the outer edges of the thrust collar. The overflow or outlet openings 36—36 in the housing communicate with the annular passages 40—40 and permit the oil to flow back into the oil reservoir 11 in the bottom of the housing.

Oil is collected in this way in sufficient quantities at all operating speeds to keep the chambers 16—16 completely filled with oil so that the bearing surfaces are fully immersed while the bearing is in operation. When the bearing is not in operation and the collar stops rotating, oil will gradually leak out of the chambers into the reservoir 11 in the bottom of the housing.

The bearing operates with equal facility in either direction of shaft rotation because the scraper is double-ended and because there are two sets of passages 34—34 as clearly shown in Figure 2.

The oil in the reservoir 11 is kept in constant motion, when the bearing is in operation, by the action of the collar in passing across the opening 28. This action—in combination with the return flow through the passages 36—36 may be utilized to maintain a constant flow of the oil over and through a pair of water coils 42—42, which are thus made effective in preventing an abnormal rise in the temperature of the oil in the system.

In the structure illustrated in Figures 1 to 4 inclusive, no guide bearings are provided within the thrust bearing housing, but my invention may be readily incorporated in a combined guide and thrust bearing as illustrated in Figures 5 and 6, reference being had first to Figure 5.

In the form here shown 41—41 designate guide bearings which are formed as a part of the housing 42 which takes the place of the housing 10 of the structure of the previous figures. The shaft 14 is provided with a thrust collar 43 which may be shrunk onto or formed solid with the shaft and which is provided with thrust surfaces 44—44, radial oil carrying surfaces 45—45, and a circumferential oil carrying surface 46. The radial surfaces 45—45 are separated from the thrust surfaces 44—44 by sealing rings 47—47 which correspond to the sealing rings 21 of the Figure 1 construction. The housing has thrust supporting surfaces 13—13 and relatively stationary bearing members 17—17. No sealing rings are provided between the chambers 12 and the guide bearings, but stuffing boxes 48—48 are provided at the outer ends of the guide bearings and they act to seal the outer ends of the chambers.

A relatively stationary scraper 50 rests on the circumferential surface of the thrust collar at the top and is adapted to remove the oil not only from the circumferential surface 46 but also from the radial oil carrying surfaces 45—45. In order to accomplish this result the scraper is provided with downwardly extending arms 51 which may be formed like turbine buckets and which discharge the oil through passages 52—corresponding to the passages 34—into the chambers 12. The upper part of the scraper is formed like the body of the scraper 31 but has axially extending projections 53—53 which overhang the adjacent annular members 59—59 of the housing and discharge the oil into oil passages 54—54 through which the oil, collected from the surface 46, is carried to the guide bearings. The latter have axial and annular grooves 55, as clearly shown in Figure 5, which act to distribute the oil along the length of the guide bearings, from which it is finally discharged into the housing through passages 56—56.

The operation of the bearing corresponds to that of the Figure 1 structure except that a portion of the oil is supplied to the guide bearings and the annular oil carrying surfaces from which the immersion chambers 12 are supplied are radial instead of cylindrical.

As shown in Figure 6, the Figure 1 construction may be more directly modified to include guide bearings 41 by suitably proportioning the housing parts and forming additional passages 57 therein that are substantially parallel to the passages 34 and divert a portion of the oil, collected by the scraper 31, to the guide bearings.

In each of the embodiments illustrated, the thrust bearing is double acting and rotationally reversible, but it is obvious that the invention is applicable to a single acting thrust bearing or to a bearing which always rotates in the same direction, or to a bearing having both features, and that other changes in form, arrangement and details of construction may be effected within the spirit and scope of my invention.

What I claim is:

1. A horizontal or inclined thrust bearing comprising a rotatable member having a thrust surface, a relatively stationary cooperating thrust member, means providing an oil-retaining chamber in which the bearing surfaces of said members are disposed, and means cooperating with said rotatable member for maintaining a bath of lubricant in said chamber in which the bearing members are immersed.

2. A horizontal or inclined thrust bearing comprising a rotatable member having a thrust surface and an oil carrying surface, a relatively stationary thrust bearing member cooperating with said thrust surface, means providing an oil-retaining chamber in which the bearing surfaces of said members are disposed, and means cooperating with said oil carrying surface for maintaining said chamber substantially full of oil in which the bearing members are immersed.

3. A horizontal or inclined thrust bearing comprising a rotatable member having a thrust surface and an oil carrying surface, a relatively stationary thrust bearing member cooperating with said thrust surface, oil-collecting means cooperating with said oil carrying surface for collecting oil therefrom, and means maintaining a bath of lubricant in which the bearing members are immersed, said bath being supplied with oil by said oil-collecting means.

4. A horizontal or inclined thrust bearing comprising a rotatable member having a thrust surface and an oil carrying surface, a relatively stationary thrust bearing member cooperating with said thrust surface, oil-collecting means cooperating with said oil carrying surface for collecting oil therefrom, and an oil-retaining chamber supplied with oil from said oil-collecting means and maintaining a bath of lubricant in which the bearing members are immersed.

5. A thrust bearing comprising a substantially horizontal shaft, a thrust collar thereon, a relatively stationary thrust member cooperating with the thrust collar, and means cooperating with said bearing members for providing and maintaining a bath of oil in which the bearing surfaces are immersed.

6. A thrust bearing comprising a substantially horizontal shaft, a thrust collar thereon, a relatively stationary thrust member cooperating with the thrust collar, and means cooperating with said bearing members for providing an oil-retaining chamber and maintaining the same substantially full of oil in which the bearing members are immersed.

7. A horizontal or inclined thrust bearing comprising a rotatable member having a thrust surface and an oil carrying surface, a relatively stationary thrust bearing member cooperating with said thrust surface, and means providing a sealed chamber enclosing the thrust bearing members, said chamber being supplied with oil from said oil carrying surface.

8. A horizontal or inclined thrust bearing comprising a rotatable member having a thrust surface and an oil carrying surface, a relatively stationary thrust bearing member cooperating with said thrust surface, means providing a sealed chamber inclosing therein the thrust bearing members, and means for collecting oil from said oil carrying surface and directing it into the sealed chamber.

9. A horizontal or inclined thrust bearing comprising a rotatable member having a thrust surface and an oil carrying surface, a relatively stationary thrust bearing member, a sealing ring cooperating with the rotatable member between the thrust and the oil carrying surfaces, and means for collecting oil from the oil carrying surface and discharging it into the space in which the relatively stationary thrust bearing member is disposed.

10. A horizontal or inclined thrust bearing comprising a thrust collar having a thrust surface and an oil carrying surface, a relatively stationary bearing member cooperating with the thrust surface of the collar, a housing forming an annular chamber in which the stationary bearing member is disposed, a wiping member engaging the collar beyond the thrust surface, and means for collecting oil from the oil carrying surface and discharging it into the chamber.

11. A horizontal or inclined thrust bearing comprising a thrust collar having a thrust surface and an oil carrying surface, a relatively stationary bearing member cooperating with the thrust surface of the collar, a housing forming an annular chamber in which the stationary bearing member is disposed, a wiping ring mounted in the housing and engaging the surface of the thrust collar between the thrust and oil-carrying surfaces, and a scraper for collecting oil from the oil carrying surface and directing it into the chamber.

12. A combined guide and thrust bearing comprising a substantially horizontal shaft having an enlargement provided with a thrust surface and an oil carrying surface, a housing forming a chamber between the thrust surface and the guide bearing, a wiping ring cooperating with said enlargement beyond the thrust surface for closing said chamber, a relatively stationary thrust bearing member mounted in said chamber, and means for maintaining a bath of lubricant in said chamber in which the bearing members are immersed and for supplying oil to the guide-bearing.

13. A combined guide and thrust bearing comprising a substantially horizontal shaft having an enlargement provided with a thrust surface and an oil carrying surface, a housing forming a chamber between the thrust surface and the guide bearing, means sealing said chamber, a relatively stationary thrust bearing member mounted in said chamber, and means dependent on the rotation of said enlargement for maintaining a bath of lubricant in said chamber in which the bearing members are immersed and for supplying oil to the guide bearing.

14. A combined guide and thrust bearing comprising a substantially horizontal shaft having an enlargement provided with a thrust surface and an oil carrying surface, a housing forming a chamber between the thrust surface and the guide bearing, means for sealing said chamber, a relatively stationary thrust bearing member mounted in said chamber, and means cooperating with said oil carrying surface for maintaining a bath of lubricant in said chamber in which the bearing members are immersed, and for supplying oil to said guide bearing.

15. A combined guide and thrust bearing comprising a substantially horizontal shaft having a thrust collar provided with a thrust surface and an oil carrying surface, a housing forming a chamber between the thrust surface and the guide bearing, a wiping ring cooperating with the thrust collar beyond said thrust surface for closing the chamber, a relatively stationary thrust bearing member mounted in said chamber, and oil-collecting means cooperating with said oil carrying surface for collecting oil therefrom and directing it to the guide bearing and into said chamber to maintain a bath of oil in which the bearing members are immersed.

16. A horizontal or inclined bearing comprising relatively rotatable bearing members, a housing for said members, means in said housing forming an oil-retaining chamber in which said bearing members operate, and means dependent on the rotation of the rotatable member for maintaining said chamber substantially full of oil to provide a bath in which said bearing members are immersed when in operation.

17. A horizontal or inclined bearing comprising relatively rotatable bearing members, a housing for said members, means in said housing forming an oil-retaining chamber in which said bearing members operate, an oil reservoir into which the rotatable member dips, and means cooperating with said rotatable member to maintain a bath of oil in said chamber in which said bearing members are immersed when in operation.

18. A horizontal or inclined bearing comprising relatively rotatable bearing members, a housing for said members, means in said housing forming an oil-retaining chamber in which said bearing members operate, an oil carrying surface on the rotatable member, and oil-collecting means cooperating with said oil carrying surface to remove oil therefrom and deliver it to said chamber to maintain therein a bath of oil in which said bearing members are immersed when in operation.

19. A horizontal or inclined bearing comprising relatively rotatable bearing members, a housing for said members, means in said housing forming an oil-retaining chamber in which said bearing members operate, an oil carrying surface on the rotatable member, a scraper cooperating with said oil carrying surface to remove oil therefrom, and passages in said housing whereby oil delivered by said scraper is conveyed to the inner portion of the bearing surfaces whence it flows outwardly therebetween, said scraper maintaining a bath of oil in said chamber in which said bearing members are immersed when in operation.

20. A combined guide and thrust bearing comprising relatively rotatable bearing members, a housing for said members, means in said housing forming an oil-retaining chamber in which the thrust bearing members operate, and means dependent on the rotation of the rotatable member for maintaining a bath of oil in said chamber in which the bearing surfaces are immersed and for supplying oil to the guide bearing.

21. A combined guide and thrust bearing comprising relatively rotatable bearing members, a housing for said members, means in said housing forming an oil-retaining chamber in which the thrust bearing members operate, an oil reservoir into which the rotatable member dips, and means cooperating with the rotatable member to maintain a bath of oil in said chamber in which the bearing surfaces are immersed and to supply oil to said guide bearings.

22. A combined guide and thrust bearing comprising relatively rotatable bearing members, a housing for said members, means in said housing forming an oil-retaining chamber in which the thrust bearing members operate, an oil carrying surface on the rotatable member, and oil-collecting means cooperating with said oil carrying surface to supply oil to said guide bearing and to maintain a bath of oil in said chamber in which the bearing surfaces are immersed.

23. A combined guide and thrust bearing comprising relatively rotatable bearing members, a housing for said members, means in said housing forming an oil-retaining chamber in which the thrust bearing members operate, an oil carrying surface on the rotatable member, a scraper cooperating with said oil carrying surface to remove oil therefrom, and passages in said housing to convey oil to the guide bearing and the inner portions of the thrust bearing surfaces, said scraper maintaining a bath of oil in said chamber in which said thrust bearing members are immersed when in operation.

24. A combined guide and thrust bearing comprising a substantially horizontal shaft having a rotatable thrust collar, a housing forming a chamber between said collar and the guide bearing, a relatively stationary thrust bearing member mounted in said chamber, oil-collecting means cooperating with the circumferential and radial surfaces of said collar for collecting oil therefrom, and means whereby the oil collected from the circumferential and radial surfaces of said collar is respectively directed to the guide bearing and to said chamber.

25. A horizontal or inclined bearing comprising relatively rotatable bearing members, a housing for said members, means in said housing forming an oil-retaining chamber in which said bearing members operate, said chamber having an inlet and an outlet adjacent its top, and means cooperating with the rotatable member for supplying said chamber with oil.

26. A horizontal or inclined bearing comprising relatively rotatable bearing members, a housing for said members, means in said housing forming an oil-retaining chamber in which said bearing members operate, said chamber having an inlet and an outlet adjacent its top, an oil carrying surface on the rotatable member, and oil-collecting means cooperating with said oil carrying surface to deliver oil through said inlet.

27. A horizontal or inclined bearing comprising relatively rotatable bearing members, a housing for said members, means in said housing forming an oil-retaining chamber in which said bearing members operate, said chamber having an inlet and an outlet adjacent its top, passages for conveying oil from said inlet to the inner portion of the bearing surfaces, and means cooperating with the rotatable member for delivering oil through said inlet.

28. In a horizontal or inclined bearing, relatively rotatable bearing members, said rotatable member having an oil-carrying surface, means cooperating with said oil-carrying surface to collect oil therefrom, a chamber in which the bearing surfaces of said bearing members are disposed and which is supplied with oil by said oil-collecting means, and means for restricting the flow of oil from said chamber to maintain therein a bath of oil in which said bearing surfaces are immersed.

29. In a horizontal or inclined bearing, relatively rotatable bearing members, said rotatable member having an oil-carrying surface, means cooperating with said oil-carrying surface to collect oil therefrom, a chamber in which the bearing surfaces of said bearing members are disposed and which is supplied with oil by said oil-collecting means, and means for substantially closing the passages through which oil may flow from said chamber other than adjacent the top thereof so as to maintain in said chamber a bath of oil in which the bearings members are immersed.

30. In a horizontal or inclined bearing, relatively rotatable bearing members, a chamber in which the bearing surfaces of said members are disposed, means for restricting the flow of oil from said chamber, and means dependent on the rotation of the rotatable bearing member for maintaining said chamber substantially full of oil.

31. In a horizontal or inclined bearing, relatively rotatable bearing members, a chamber in which the bearing surfaces of said members are disposed, means for substantially closing the passages through which oil may flow from said chamber other than adjacent the top thereof, and means dependent on the rotation of the rotatable bearing member for maintaining said chamber substantially full of oil.

32. In a combined thrust and guide bearing for a horizontal or inclined shaft, relatively rotatable bearing members, a chamber in which the thrust surfaces of said members are disposed, means for restricting the flow of oil from said chamber, means dependent on the rotation of the rotatable bearing member for maintaining said chamber substantially full of oil, and means whereby oil is also supplied to the guide bearing.

33. In a combined guide and thrust bearing for a horizontal or inclined shaft, relatively rotatable bearing members, the rotatable bearing member having an oil-carrying surface, means cooperating with the oil-carrying surface for collecting oil therefrom, a chamber in which the thrust surfaces of the bearing are disposed and which is supplied with oil by said oil-collecting means, means for restricting the flow of oil from said chamber to maintain therein a bath of oil in which the thrust bearing surfaces are immersed, and means whereby the collected oil may also flow to the guide bearing.

In witness whereof, I have hereunto set my hand this 16 day of November, 1918.

ALBERT KINGSBURY.